(12) United States Patent  
Cauthen

(10) Patent No.: US 9,580,078 B2
(45) Date of Patent: Feb. 28, 2017

(54) SYSTEMS AND METHODS FOR PREHEATING HYBRID VEHICLES

(71) Applicant: Toyota Motor Engineering & Manufacturing North America, Inc., Erlanger, KY (US)

(72) Inventor: Craig A. Cauthen, Orange, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 359 days.

(21) Appl. No.: 14/496,522

(22) Filed: Sep. 25, 2014

(65) Prior Publication Data

US 2016/0090096 A1 Mar. 31, 2016

(51) Int. Cl.
*B60W 30/194* (2012.01)
*B60W 10/30* (2006.01)
*B60W 20/00* (2016.01)
*B60W 50/00* (2006.01)

(52) U.S. Cl.
CPC .......... *B60W 30/194* (2013.01); *B60W 10/30* (2013.01); *B60W 20/00* (2013.01); *B60W 50/0097* (2013.01); *Y10S 903/93* (2013.01)

(58) Field of Classification Search
CPC .... B60W 30/194; B60W 20/00; B60W 10/30; B60W 50/0097; Y10S 903/93
See application file for complete search history.

(56) References Cited

U.S. PATENT DOCUMENTS

| 5,255,733 A * | 10/1993 | King | B60H 1/004 123/142.5 R |
|---|---|---|---|
| 5,285,963 A | 2/1994 | Wakefield et al. | |
| 5,291,960 A | 3/1994 | Brandenburg et al. | |
| 8,413,423 B2 | 4/2013 | Roos et al. | |
| 8,525,480 B2 | 9/2013 | Anderson | |
| 8,726,682 B1 * | 5/2014 | Olson | F25B 30/00 62/235.1 |
| 2004/0007403 A1 * | 1/2004 | Tomatsuri | B60K 6/445 180/65.235 |
| 2004/0045753 A1 * | 3/2004 | Yamaguchi | B60K 6/445 180/65.28 |
| 2006/0011150 A1 * | 1/2006 | Rogers | F01P 11/20 123/41.14 |

(Continued)

FOREIGN PATENT DOCUMENTS

DE 10201001760 1/2012
EP 1382475 8/2006

*Primary Examiner* — Mussa A Shaawat
(74) *Attorney, Agent, or Firm* — Dinsmore & Shohl LLP

(57) ABSTRACT

A method of preheating a hybrid vehicle including storing reserve coolant in an insulated reservoir fluidly coupled to a coolant circuit of an engine of the hybrid vehicle; powering a fluid pump fluidly coupled to the coolant circuit with a power source external to the hybrid vehicle; pumping line coolant through the coolant circuit with the fluid pump; powering a heater thermally coupled to the coolant circuit with the power source external to the hybrid vehicle; heating the line coolant with the heater as the line coolant is pumped through the coolant circuit to increase a temperature of the line coolant; and mixing the line coolant with the reserve coolant to accelerate preheating of at least the engine of the hybrid vehicle.

20 Claims, 5 Drawing Sheets

(56) References Cited

U.S. PATENT DOCUMENTS

| | | | |
|---|---|---|---|
| 2009/0145375 A1* | 6/2009 | Kaita | B60K 11/02 |
| | | | 123/41.02 |
| 2010/0084112 A1 | 4/2010 | Piccard et al. | |
| 2010/0280698 A1 | 11/2010 | Ichikawa | |
| 2011/0178665 A1* | 7/2011 | Yoshioka | B60W 10/06 |
| | | | 701/22 |
| 2014/0137591 A1* | 5/2014 | Rutherford | F24F 3/06 |
| | | | 62/324.1 |
| 2015/0354426 A1* | 12/2015 | Crawford | F01N 9/00 |
| | | | 60/274 |
| 2015/0354868 A1* | 12/2015 | Poerio | F25B 30/02 |
| | | | 62/115 |

* cited by examiner

SYSTEMS AND METHODS FOR PREHEATING HYBRID VEHICLES

The present specification generally relates to methods for preheating various components of hybrid vehicles and, more specifically, to methods for preheating these components prior to starting the hybrid vehicle.

BACKGROUND

In general, the engine and emission parts of a hybrid vehicle are more efficient and produce fewer emissions when running at an optimal temperature. When a hybrid vehicle has been sitting idle, various components may be at a temperature below their optimal operating temperatures. Once the engine of the hybrid vehicle is started, it may take some time for these components to reach their optimal operating temperatures, causing these components to run less efficiently and produce more emissions.

Accordingly, a need exists for alternative methods for preheating engine and emission parts of a hybrid vehicle.

SUMMARY

In one embodiment, a method of preheating a hybrid vehicle includes storing reserve coolant having a temperature $T_R$ in an insulated reservoir fluidly coupled to a coolant circuit of an engine of the hybrid vehicle; powering a fluid pump fluidly coupled to the coolant circuit with a power source external to the hybrid vehicle; pumping line coolant with a temperature $T_L$ (which is less than or equal to the temperature $T_R$ of the reserve coolant) through the coolant circuit with the fluid pump; powering a heater thermally coupled to the coolant circuit with the power source external to the hybrid vehicle; heating the line coolant with the heater as the line coolant is pumped through the coolant circuit to increase a temperature of the line coolant; and mixing the line coolant with the reserve coolant to accelerate preheating of at least the engine of the hybrid vehicle.

In another embodiment, a hybrid vehicle preheating system includes an insulated reservoir fluidly coupled to a coolant circuit of an engine of a hybrid vehicle and storing reserve coolant having a temperature $T_R$ that is heated to a high temperature during operation of the hybrid vehicle; a fluid pump fluidly coupled to the coolant circuit and powered by a power source external to the hybrid vehicle; a heater thermally coupled to the coolant circuit and powered by a power source external to the hybrid vehicle; and an electronic control unit communicatively coupled to the fluid pump, the heater, and a valve of the insulated reservoir. The electronic control unit includes a processor and a memory storing computer readable and executable instructions that, when executed by the processor cause the electronic control unit to pump line coolant having a temperature $T_L$ (which is less than or equal to the temperature $T_R$ of the reserve coolant) through the coolant circuit with the fluid pump; heat the line coolant with the heater as the line coolant is pumped through the coolant circuit to increase the temperature of the line coolant; and open the valve of the insulated reservoir to mix the reserve coolant with the line coolant and accelerate preheating of at least the engine of the hybrid vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to methods and systems for preheating at least the engine of a hybrid vehicle prior to starting the engine of the hybrid vehicle. According to one embodiment, a method of preheating a hybrid vehicle includes storing reserve coolant in an insulated reservoir fluidly coupled to a coolant circuit of an engine of the hybrid vehicle. The reserve coolant may have a temperature $T_R$. A fluid pump may be powered with a power source external to the hybrid vehicle to pump line coolant through the coolant circuit. The line coolant may have a temperature $T_L$ that is less than or equal to the temperature $T_R$ of the reserve coolant. As the line coolant is pumped through the coolant circuit, the line coolant may be heated with a heater to increase a temperature of the line coolant. The line coolant may be heated with a heater thermally coupled to the coolant circuit and powered with a power source external to the hybrid vehicle. The line coolant is mixed with the reserve coolant after heating to accelerate preheating of at least the engine of the hybrid vehicle. In embodiments, mixing may occur after the engine of the hybrid vehicle has started. In some other embodiments, mixing may occur when a preheat temperature $T_P$ of the line coolant is greater than the temperature $T_L$ and less than or equal to the temperature $T_R$. Various embodiments of methods and systems for preheating at least the engine of the hybrid vehicle will be described in more detail herein with specific reference to the appended drawings.

The phrase "communicatively coupled" is used herein to described the interconnectivity of various components of the preheating system and means that the components are connected either through wires, waveguides, or wirelessly such that electrical, optical, and/or electromagnetic signals may be exchanged between the components.

Figure 1:
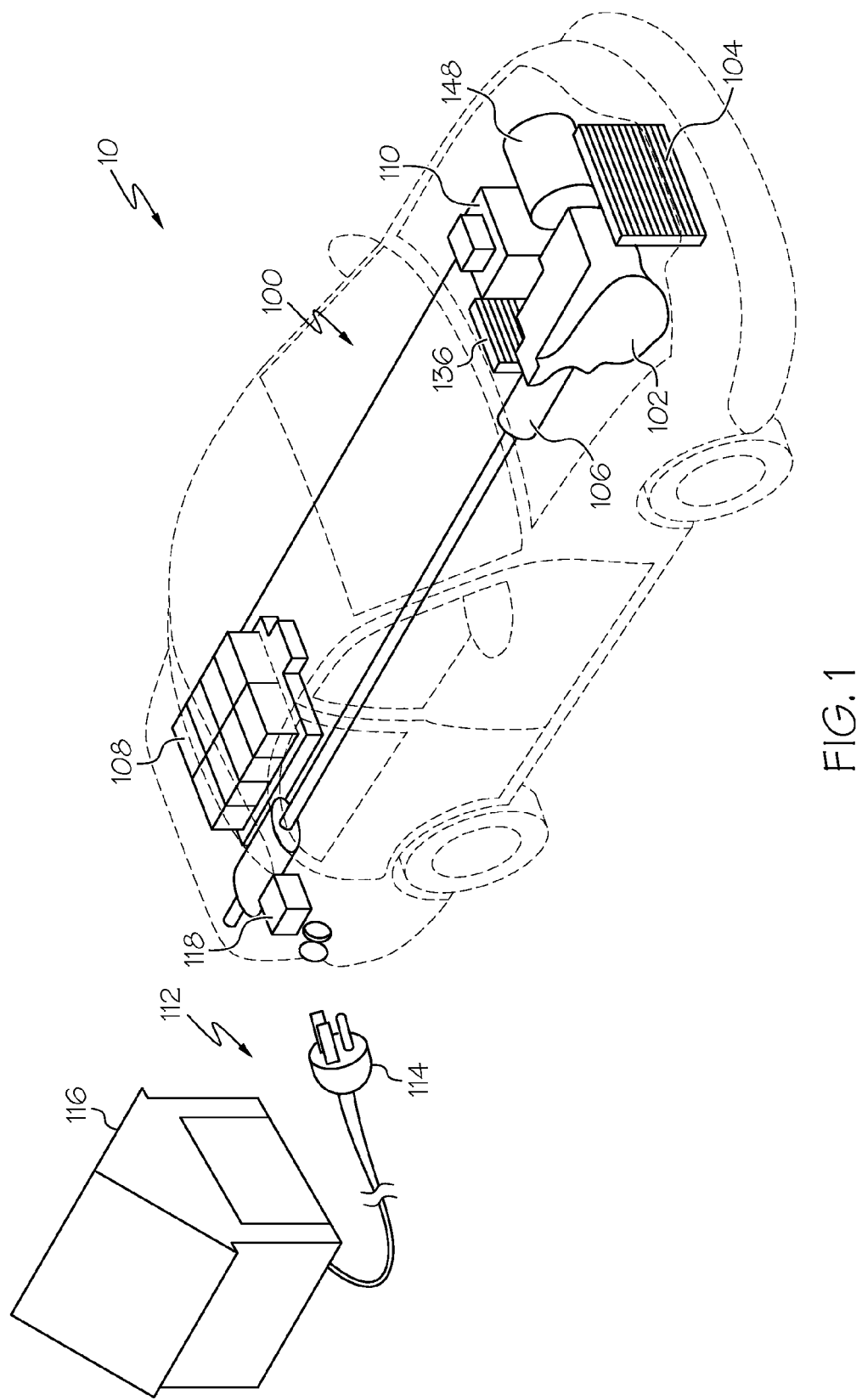
FIG. 1 schematically depicts a perspective view of a hybrid vehicle having at least an engine, a radiator, a catalytic converter, an electronic control unit, an external power source, and a coolant circuit according to one or more embodiments shown and described herein.
Figure 2:
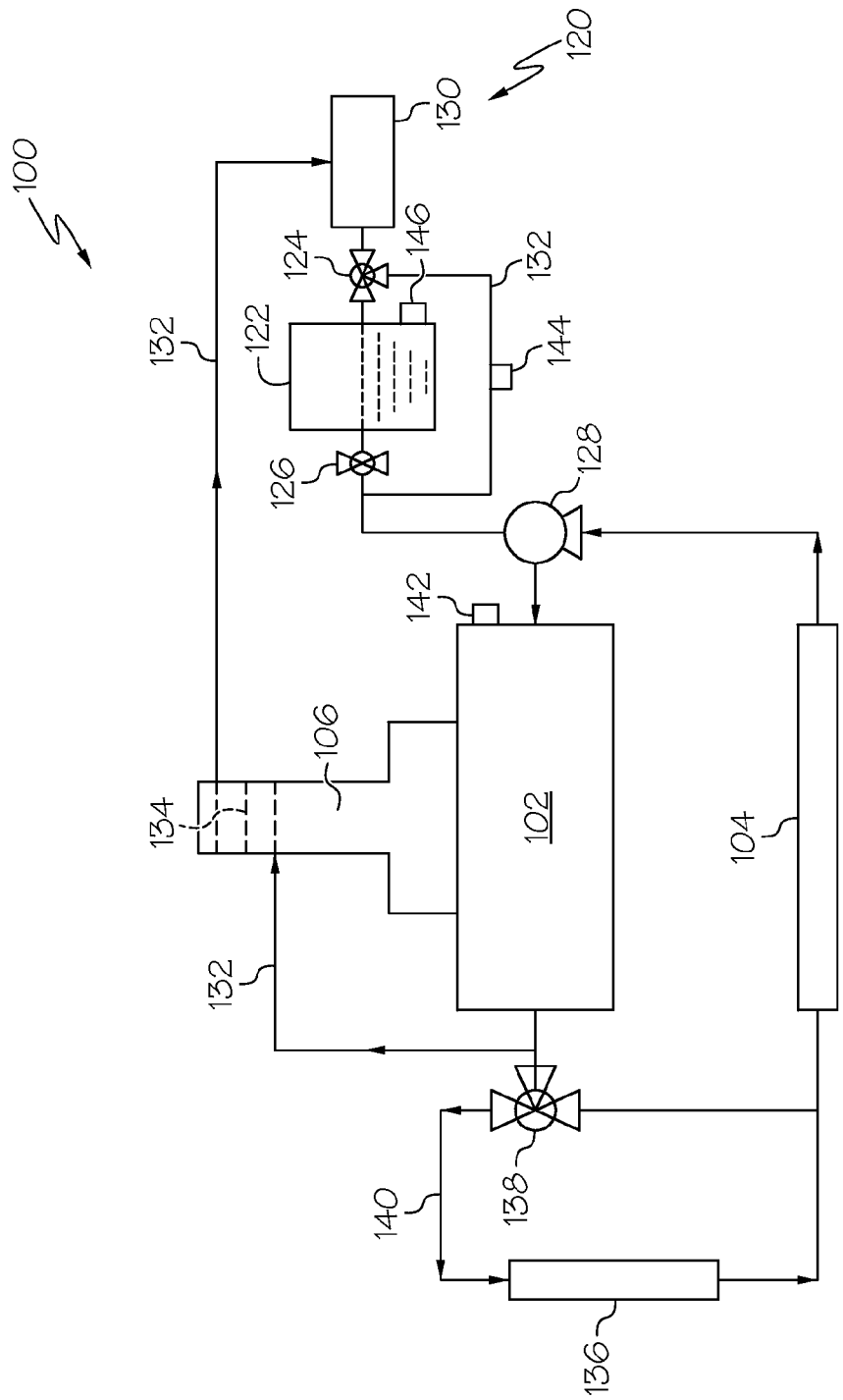
FIG. 2 schematically depicts a coolant circuit of the hybrid vehicle having coolant lines, a plurality of valves, an insulated reservoir, a fluid pump, a heater, and an external power source, according to one or more embodiments shown and described herein.

Referring now to FIGS. 1 and 2, one embodiment of a hybrid vehicle 10 including a preheating system 100 for preheating at least an engine 102 of the hybrid vehicle 10 is schematically depicted. The hybrid vehicle 10 includes an engine 102, such as a conventional gasoline engine, and a motor 148. The engine 102 and motor 148 may be used independently or in conjunction with one another to provide rotational motion to the drive wheels of the hybrid vehicle 10. In the embodiments described herein, the engine 102 of the hybrid vehicle 10 may be thermally coupled to a coolant circuit 120 and a radiator 104. A fluid pump 128 pumps line coolant through the coolant circuit 120 and engine 102 such that heat generated by the engine 102 during normal engine operation is carried away from the engine 102 by the line coolant and is dissipated to the environment with the radiator 104. The coolant circuit 120 and fluid pump 128 may also be utilized to preheat at least the engine 102 of the hybrid vehicle 10, as will be described in further detail herein.

Still referring to FIGS. 1 and 2, the hybrid vehicle 10 also includes a catalytic converter 106 coupled to an exhaust system of the engine 102. The catalytic converter 106 contains a catalyst, such as, for example, platinum and/or palladium, which reduces engine emissions during operation of the engine 102. For example, the catalytic converter 106 may convert hydrocarbons into carbon dioxide and water, nitrogen oxides into nitrogen and oxygen, and carbon monoxide into carbon dioxide thereby reducing engine emissions. The efficiency of the catalytic converter 106 may be dependent on the operating temperature of the catalytic converter 106, with higher temperatures generally providing greater conversion efficiencies thereby decreasing engine emissions. In the embodiments described herein, the coolant circuit 120 of the preheating system 100 may be thermally coupled to the catalytic converter 106 such that heated line coolant passes through and/or around the catalytic converter 106, thereby preheating the catalytic converter 106 prior to starting the engine 102 of the hybrid vehicle 10 and increasing the conversion efficiency of the catalytic converter 106 upon starting the engine 102 of the hybrid vehicle 10.

The hybrid vehicle 10 may also include a battery 108. The battery 108 provides power to the various electrical systems and devices of the hybrid vehicle 10 and also powers the motor 148 of the hybrid vehicle 10, enabling the motor 148 to provide rotational motion to the drive wheels of the hybrid vehicle 10 during electric modes of operation (i.e., those modes of operation when only the motor 148 of the vehicle is used to power the drive wheels of the hybrid vehicle 10) or hybrid modes of operation (i.e., when both the motor 148 and engine 102 are used to provide rotational motion to the drive wheels of the hybrid vehicle 10). For example, the battery 108 may be coupled to a charging circuit 118 that charges the battery 108. To facilitate charging the battery 108, the charging circuit 118 may be coupled to an external power source 116 through the use of electric vehicle supply equipment ("EVSE") 112 that includes an adapter 114. The adapter 114 may be an electrical plug or other component for supplying power from an external power source 116 to the hybrid vehicle 10. In the embodiment shown in FIGS. 1 and 2, the external power source 116 may be an electrical outlet in a residence. Alternatively, the external power source 116 may be an electrical outlet in an office building or a dedicated charging station for a hybrid vehicle 10.

Referring now to FIG. 2, a more detailed view of the components of the preheating system 100 for a hybrid vehicle is schematically depicted. The preheating system 100 includes the coolant circuit 120 coupled to the engine 102, radiator 104, and catalytic converter 106, as described above. The coolant circuit 120 also includes an insulated reservoir 122; a fluid pump 128; a heater 130; valves 124 and 126; and sensors 142, 144, and 146. The various components of the coolant circuit 120 are coupled to one another and to the engine 102, radiator 104, and catalytic converter 106 with coolant lines 132. For example, the coolant lines 132 pass around and through at least the engine 102 and the catalytic converter 106. In embodiments, the coolant lines 132 may pass around the exterior of the catalytic converter 106, as described hereinabove, to form a heating jacket 134. The coolant lines 132 are fluidly connected to the insulated reservoir 122 with valves 124 and 126. In other embodiments, the coolant circuit 120 may optionally include coolant lines 140 coupled to the cabin heater 136 of the hybrid vehicle. The coolant lines 140 are fluidly connected to the coolant circuit 120 with valve 138 that controls the flow of the circulating line coolant into the coolant lines 140 and cabin heater 136.

The fluid pump 128 is fluidly coupled to the coolant circuit 120 and circulates the line coolant through the coolant lines 132. In the embodiments described herein, the fluid pump 128 is an electrically-powered fluid pump (as opposed to a mechanically-powered fluid pump) that is suitable for pumping fluid through coolant lines 132 in a hybrid vehicle 10 when the engine 102 and motor 148 of the hybrid vehicle 10 are not in operation. In the embodiments described herein, the fluid pump 128 is electrically coupled to an external power source 116 through battery 108, charging circuit 118, and adapter 114.

The heater 130 is thermally coupled to the coolant circuit 120 and provides heat to the line coolant as it is circulated through the coolant lines 132 by the fluid pump 128. In the embodiments described herein, the heater 130 is an electrically powered heater, such as a radiative heater, a convection heater, an immersion heater or the like. For example, in embodiments, the heater 130 may comprise a series of resistive heating coils through which the coolant lines 132 pass such that line coolant within the coolant lines 132 is radiatively heated. In the embodiments described herein, the heater 130 is electrically coupled to an external power source 116 through battery 108, charging circuit 118, and adapter 114. The fluid pump 128 and heater 130 are electrically coupled to the battery 108 and communicatively coupled to the electronic control unit 110.

Still referring to FIG. 2, the insulated reservoir 122 stores a portion of the line coolant (the stored portion of the line coolant being referred to as reserve coolant) that is heated to a temperature $T_R$ during operation of the engine 102 of the hybrid vehicle 10. Specifically, during operation of the engine 102 of the hybrid vehicle 10, line coolant is pumped through the engine 102 to remove heat generated during normal operation of the engine 102, as described above. Accordingly, after passing through the engine 102, the temperature of the line coolant is increased to the temperature $T_R$. As the heated line coolant continues to circulate through the coolant circuit 120, a portion of the heated line coolant may be siphoned into the insulated reservoir 122 through actuation of three-way valve 124. Once the insulated reservoir 122 is filled, the three-way valve 124 may be actuated to divert the line coolant around the insulated reservoir 122 and back into the fluid pump 128. In embodiments, heated line coolant is stored in the insulated reservoir 122 after the engine 102 of the hybrid vehicle 10 is turned off. Alternatively, heated line coolant may be stored in the insulated reservoir 122 during operation of the engine 102 and periodically replenished to maintain the temperature $T_R$ of the reserve coolant. In the embodiments described herein, the insulated reservoir 122 is adequately insulated to maintain the temperature of the reserve coolant $T_R$ for extended periods of time after the engine 102 of the vehicle has been turned off.

A plurality of sensors may also be coupled to the coolant circuit 120 and used to sense the various temperatures in and around the hybrid vehicle 10. In one embodiment, the plurality of sensors includes an ambient temperature sensor 142, a line coolant sensor 144, and a reserve coolant sensor 146. The ambient temperature sensor 142 is coupled to the engine 102 of the hybrid vehicle 10. The ambient temperature sensor 142 is used to sense the ambient temperature $T_A$ of the environment of the hybrid vehicle 10. The line coolant sensor 144 is coupled to the coolant lines 132 of the coolant circuit 120. The line coolant sensor 144 is used to sense a temperature $T_L$ of the line coolant prior to preheating and a preheat temperature $T_P$ of the line coolant during preheating. The reserve coolant sensor 146 is coupled to the insulated reservoir 122. The reserve coolant sensor 146 is used to sense a temperature of the reserve coolant $T_R$ while it is stored in the insulated reservoir 122. Sensors 142, 144, and 146 are all communicatively coupled to the electronic control unit 110.

Figure 3:
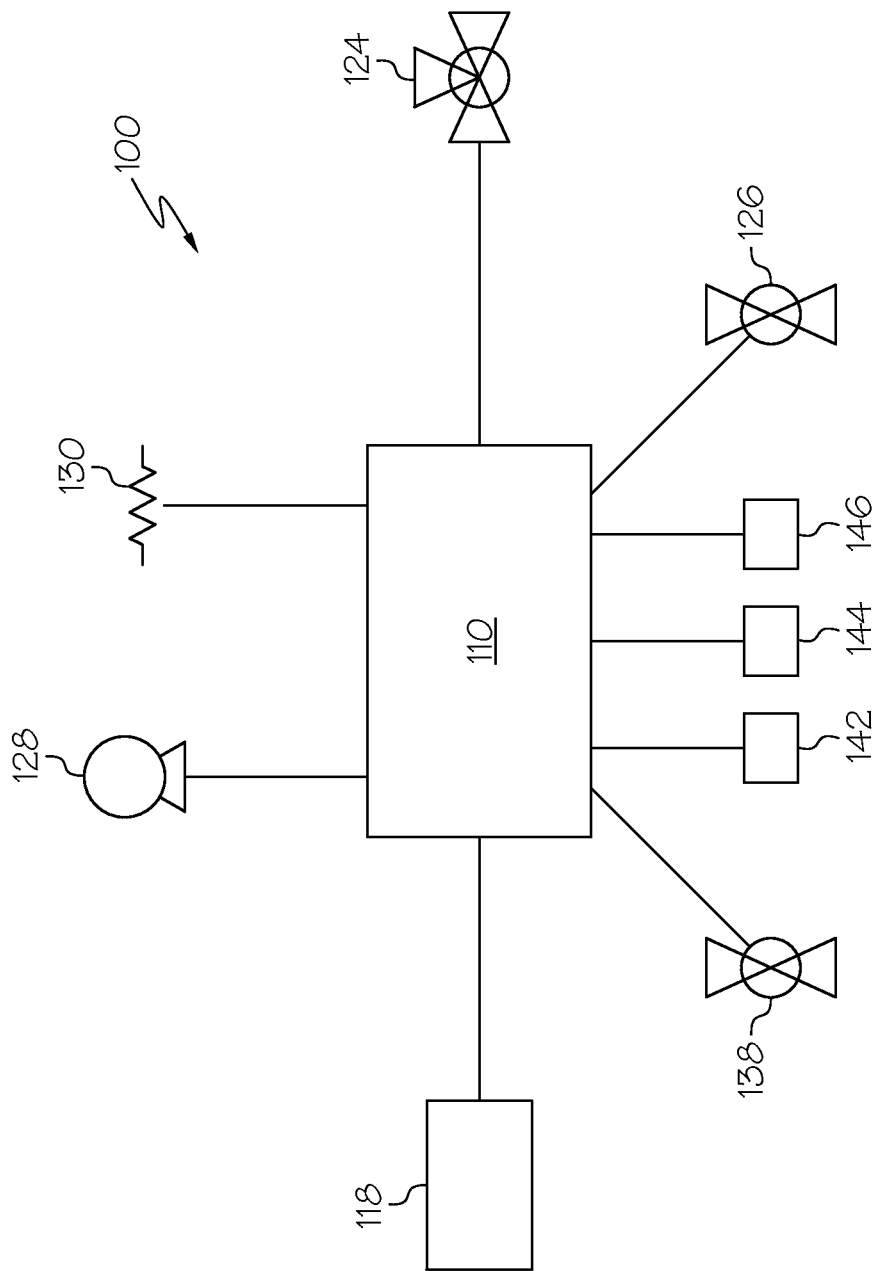
FIG. 3 schematically depicts the electrical interconnectivity of the components of a system for preheating at least the engine of a hybrid vehicle having an electronic control unit, a coolant circuit, a plurality of valves, a fluid pump, a heater, and an external power source, according to one or more of the embodiments shown and described herein.

Referring now to FIG. 3, the interconnectivity of the various electrical components of the preheating system 100 is schematically depicted. Specifically, the preheating system 100 of the hybrid vehicle 10 includes an electronic control unit 110 that controls the operation of the various electrical components of the preheating system 100. The electronic control unit 110 includes a processor (not shown) and a non-volatile memory (not shown) that is electronically coupled to the processor. The non-volatile memory stores a computer readable and executable instruction set that, when executed by the processor, facilitates the operation of at least the charging circuit 118, fluid pump 128, heater 130, and valves 124, 126, and 138. In some embodiments, the electronic control unit 110 may be a standalone controller. In other embodiments, the electronic control unit 110 may be an engine control unit, which is communicatively coupled to the engine 102. In other embodiments, the electronic control unit 110 may be a motor control unit communicatively coupled to the electric motor 148. In embodiments where the electronic control unit 110 is a motor control unit, the electronic control unit 110 may be responsible for controlling the electric motor 148, such as regulating the power supplied to the motor 148, regenerative breaking, and the like.

In some embodiments, the electronic control unit 110 is communicatively coupled to the sensors 142, 144, and 146 that sense various temperatures in and around the hybrid vehicle 10. In some embodiments, these sensors include an ambient temperature sensor 142 that senses the ambient temperature $T_A$ of the environment of the hybrid vehicle 10, a line coolant sensor 144 that senses the temperature $T_L$ of the line coolant prior to preheating and the preheat temperature $T_P$ of the line coolant during preheating, and a reserve coolant sensor 146 that senses the temperature of the reserve coolant $T_R$. The electronic control unit 110 receives signals from these sensors and utilizes the data to calculate a preheat duration, determine a preheat start time, and initiate preheating.

Still referring to FIG. 3, the fluid pump 128 and heater 130 are communicatively coupled to the electronic control unit 110. In the embodiments described herein, the electronic control unit 110 controls the operation of the fluid pump 128 (i.e., turns the fluid pump 128 on or off) to facilitate pumping the line coolant through the coolant lines 132 and the heater 130. The electronic control unit 110 controls the operation of the heater 130 (i.e., turns the heater 130 on or off) to provide heat to the line coolant and increase the temperature $T_L$ of the line coolant to a preheat temperature $T_P$. In embodiments that will be described in further detail herein, the electronic control unit 110 begins to operate the fluid pump 128 and heater 130 at a time determined by an algorithm based on data such as the normal start time of the hybrid vehicle 10, the ambient temperature $T_A$ of the environment of the hybrid vehicle 10, and the temperature $T_L$ of the line coolant. In other embodiments, the electronic control unit 110 begins to operate the fluid pump 128 and heater 130 at a predetermined time.

The charging circuit 118 is communicatively coupled to the electronic control unit 110. As described earlier, the charging circuit 118 is electrically coupled to the battery 108 and the external power source 116 through adapter 114. The battery 108 is electrically coupled to the fluid pump 128 and heater 130, such that the battery 108 provides electric power capable of operating the fluid pump 128 to circulate the line coolant and the heater 130 to raise the temperature $T_L$ of the line coolant. In some embodiments, the electronic control unit 110 selectively controls the charging of the charging circuit 118 when the battery 108 is powering the fluid pump 128 and heater 130 so as to ensure that the charging circuit 118 and battery 108 are not depleted when the preheating system is in operation.

Still referring to FIG. 3, valves 124 and 126 connected to the insulated reservoir 122 are communicatively coupled to the electronic control unit 110. In this embodiment, the valve 124 is a three way valve that can be actuated by the electronic control unit 110 to allow the line coolant to flow into either the insulated reservoir 122 or into coolant lines 132 that bypass the insulated reservoir 122 (as shown in FIG. 2). For example, the valve 124 may be selectively actuated to prevent any line coolant from entering the insulated reservoir 122 and instead direct the line coolant around the insulated reservoir 122. Alternatively, the valve 124 may be selectively actuated to allow line coolant to flow into the insulated reservoir 122 for storage. The valve 126 is a two-way valve that can be actuated by the electronic control unit 110 to allow line coolant to flow out of the insulated reservoir 122. The valve 126 may also be selectively actuated to prevent or allow reserve coolant from flowing out of the insulated reservoir 122. The valves 124 and 126 may be of any type of fluid valve suitable for electrical actuation by the electronic control unit 110.

In embodiments, the electronic control unit 110 may open the valves 124 and 126 to allow line coolant to enter the insulated reservoir 122 and mix with the reserve coolant in the insulated reservoir 122 and, thereafter, flow out of the insulated reservoir through valve 126. Alternatively, the electronic control unit 110 may close the valve 126 and open valve 124 to allow line coolant to flow into the insulated reservoir 122 for storage. Once the insulated reservoir 122 is filled, the electronic control unit 110 may close valve 124, thereby redirecting line coolant around the insulated reservoir 122.

Still referring to FIG. 3, in some embodiments, the valve 138 to the cabin heater 136 is also communicatively coupled to the electronic control unit 110. In the embodiment shown in FIGS. 2 and 3, the valve 138 is a three-way valve and either allows line coolant to circulate in the coolant lines 140 fluidly coupled to the cabin heater 136 and radiator 104 or it blocks the line coolant from circulating. In this embodiment, the electronic control unit 110 opens the valve 138 to allow line coolant to circulate in the coolant lines 140 at a time predetermined and calculated by the electronic control unit 110. In another embodiment, the electronic control unit 110 opens the valve 138 when the engine 102 of the hybrid vehicle 10 is started.

Figure 4:
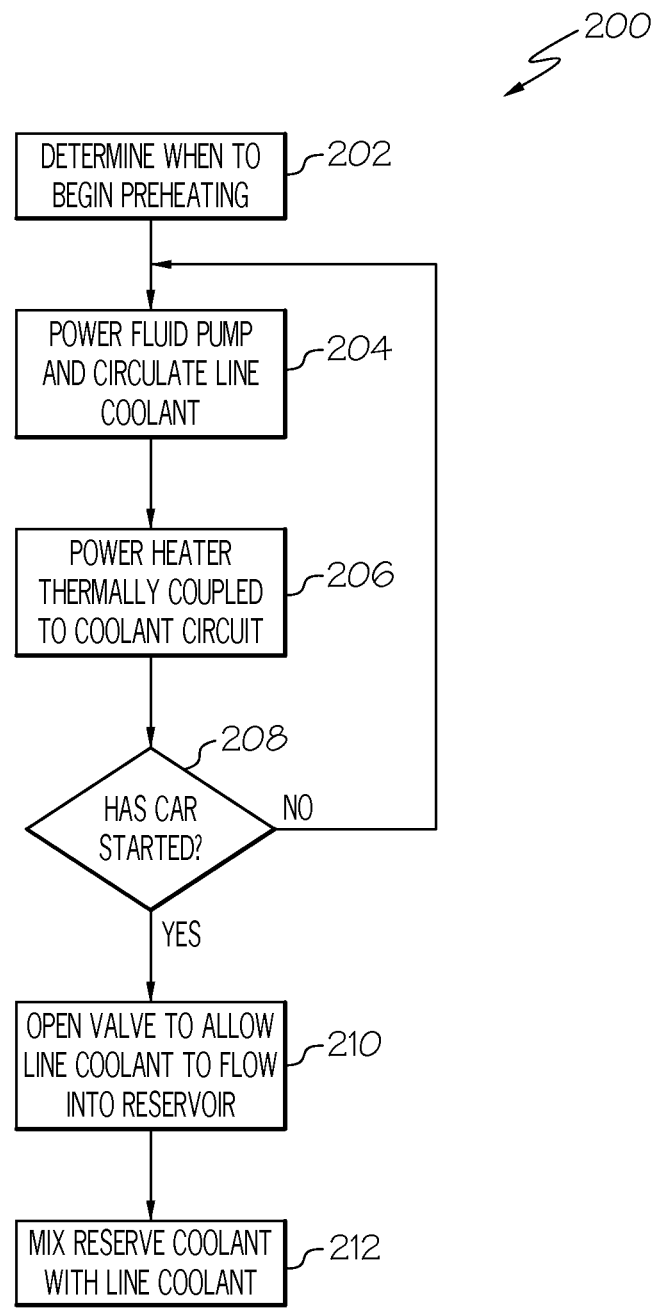
FIG. 4 is a logic flowchart of a method for operating a preheating system for a hybrid vehicle according to one or more embodiments shown and described herein.

Turning now to FIGS. 2-4, one embodiment of a method of operating the preheating system is depicted in the flow chart 200 of FIG. 4. In a first step 202, the electronic control unit 110 may optionally predict, automatically, the start time of the hybrid vehicle 10 and determine a preheat start time. In embodiments, the logic may operate in a learning mode wherein the logic tracks the start times of the hybrid vehicle 10 and evaluates that data to determine a baseline start time of the hybrid vehicle 10 based on a number of variables, including, but not limited to, previous start times, the day of the week, or the time of year. The logic is included within the computer readable and executable instruction set that is capable of determining the preheat start time for the hybrid vehicle 10. In embodiments, the electronic control unit 110 may also sense, through the use of sensors 142, 144, and 146, the ambient temperature and the temperature $T_L$ of the line coolant to determine a preheat duration. For example, in some embodiments, the electronic control unit 110 may contain a look-up table of preheat durations stored in memory. The preheat durations may be indexed according to the ambient temperature $T_A$ and the temperature $T_L$ of the line coolant. Using the sensed values of the ambient temperature $T_A$ and the temperature $T_L$ of the line coolant, the electronic control unit 110 may determine a preheat duration from the look-up table stored in memory. Based on the normal start-time of the hybrid vehicle 10 and the calculated preheat duration, the electronic control unit 110 then determines the preheat start time so that, in some embodiments, at least the engine 102 of the hybrid vehicle 10 is preheated to a predetermined temperature at the predicted start time of the hybrid vehicle 10. In other embodiments, the electronic control unit 110 then determines the preheat start time so that the engine 102 and the catalytic converter 106, and, optionally, the cabin heater 136 are preheated in advance of the normal start time of the engine 102 of the hybrid vehicle 10. The phrase "predetermined temperature," as used herein, means the minimum temperature to which the engine 102 and/or catalytic converter 106 are heated to effect efficient operation in terms of fuel economy and/or reduced emissions. It should also be understood that the "predetermined temperature" may vary depending on the type of hybrid vehicle. Once determined, the preheat start time is stored in the memory of the electronic control unit 110, which uses the preheat start time to trigger the preheating method.

In the methods for preheating a hybrid vehicle described herein, initiation of the preheating method is conditioned on the hybrid vehicle 10 being electrically coupled to an external power source 116. This condition prevents the battery reserves of the hybrid vehicle 10 from being depleted by the preheating process. In embodiments, the charging circuit 118 of the hybrid vehicle 10 may provide a signal to the electronic control unit 110 indicating that the hybrid vehicle 10 is coupled to an external power source 116 through adapter 114. In the embodiments described herein, the engine 102 of the hybrid vehicle 10 is off upon initiation of the preheating method and the insulated reservoir 122 contains reserve coolant at a temperature $T_R$, which is greater than the temperature $T_L$ of the line coolant.

Still referring to FIGS. 2-4, after the optional first step 202 is completed, the preheat start time has arrived, and the hybrid vehicle 10 is connected to an external power source 116, the method for preheating the hybrid vehicle 10 is initiated at step 204. At step 204, the electronic control unit 110 powers the fluid pump 128 with the external power source 116 such that the fluid pump 128 begins circulating the line coolant through the coolant lines 132. At this point, the line coolant has not been preheated and has a temperature $T_L$.

At step 206, the electronic control unit 110 powers the heater 130 with the external power source 116 thereby providing heat to the line coolant with the heater 130 as the line coolant circulates through the coolant circuit 120, eventually raising the line coolant temperature $T_L$ to a preheat temperature of $T_P$. In embodiments, as the line coolant passes through the heater 130, the electronic control unit 110 initially diverts the line coolant around the insulated reservoir 122 by closing valves 124 and 126 in order to prevent mixing of the line coolant with the heated reserve coolant contained in the insulated reservoir 122.

As the line coolant is circulated through the coolant circuit 120, heat imparted to the line coolant by the heater 130 is transferred to the engine 102 and the catalytic converter 106, thereby raising the temperature of the engine 102 and catalytic converter 106, as the line coolant passes through the engine 102 and around and/or through the catalytic converter 106. In order to maximize heat transfer to the engine 102 and catalytic converter 106, the electronic control unit 110 initially diverts line coolant away from the cabin heater 136 and radiator 104 by closing valve 138, thereby preventing coolant from circulating through the cabin heater 136 and radiator 104 and reducing heat loss to the cabin heater 136 and radiator 104.

Figure 5:
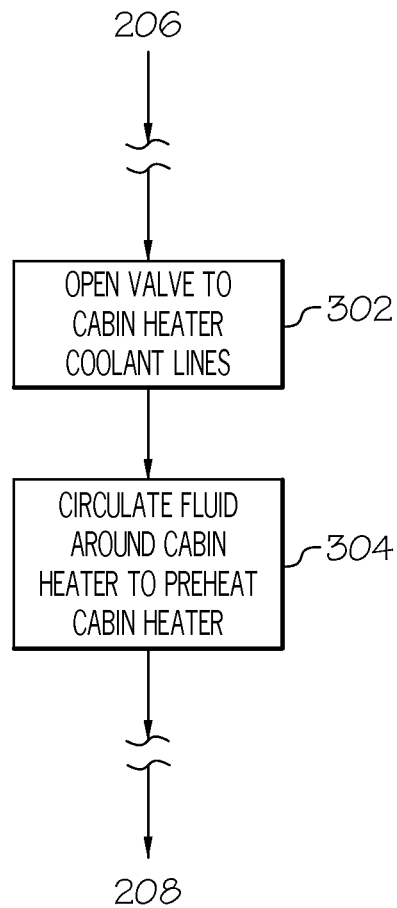
FIG. 5 is a logic flowchart of a method for operating a preheating system for the cabin heater of a hybrid vehicle according to one or more embodiments shown and described herein.

Referring to FIGS. 4 and 5, in some embodiments, the method may include additional steps between step 206 and step 208. For example, in one embodiment, the electronic control unit 110 may optionally open the valve 138 at step 302 to allow line coolant to circulate into both the catalytic converter 106 and the cabin heater 136 at step 304 once the line coolant has reached a predetermined preheat temperature $T_P$ as determined by the line coolant sensor 144.

Referring again to FIG. 4, in one embodiment, the electronic control unit 110 determines whether the engine 102 of the hybrid vehicle 10 has been started in a fourth step 208. If the engine 102 has not been started, the electronic control unit 110 continues to pump the line coolant with the fluid pump 128 and provide heat to the line coolant with the heater 130, thereby preheating the engine 102 and catalytic converter 106. However, once the electronic control unit 110 determines that the engine 102 has been started, the method of preheating the hybrid vehicle 10 advances to the fifth step 210.

In the fifth step 210, the electronic control unit 110 opens the valves 124 and 126 to the insulated reservoir 122, which allows line coolant to enter the insulated reservoir 122 and mix with the reserve coolant (step 212) at the higher temperature $T_R$, thereby rapidly increasing the temperature of the line coolant. The line coolant (now mixed with the reserve coolant) exits the insulated reservoir through valve 126 and is circulated back through the fluid pump 128 and into the engine 102 and catalytic converter 106, further increasing the temperature of these components and decreasing the time needed to preheat the engine 102 and catalytic converter 106 of the hybrid vehicle 10.

While FIG. 4 depicts one embodiment of the method for preheating a hybrid vehicle 10 in which line coolant is mixed with reserve coolant after the engine 102 of the hybrid vehicle 10 is started, it should be understood that other embodiments are possible and contemplated. In embodiments, the electronic control unit 110 opens the valves 124 and 126 at a time determined by an algorithm based on data such as the normal start time of the hybrid vehicle 10, the ambient temperature $T_A$, the temperature of the line coolant $T_L$, the preheat temperature $T_P$ of the line coolant, or the temperature of the reserve coolant $T_R$. For example, in one embodiment, the fifth step 210 and sixth step 212 may occur when the preheat temperature $T_P$ of the coolant is greater than the initial temperature $T_L$ of the line coolant prior to preheating, but less than or equal to the temperature of the reserve coolant $T_R$. That is, the fifth step 210 and sixth step 212 only occur when the line coolant has reached a preheat temperature $T_P$ instead of when the engine 102 of the hybrid vehicle 10 is switched on.

Embodiments of the preheating method shown in FIGS. 4-5 may continue until the engine 102 of the hybrid vehicle 10 is started. In other embodiments, the electronic control unit 110 may stop pumping the line coolant with the fluid pump 128 and providing heat to the line coolant with the heater 130 after it has been preheating for a predetermined amount of time or the pre-heat temperature $T_P$ of the line coolant reaches a pre-determined temperature.

It should now be understood that the embodiments described herein relate to methods and systems for more rapidly preheating a hybrid vehicle that also improve fuel economy and reduce engine emissions. The embodiments described herein utilize an external power source to heat and circulate line coolant through the coolant circuit of the vehicle to preheat the engine and/or the catalytic converter, thereby avoiding depletion of the batteries of the hybrid vehicle prior to starting the engine of the hybrid vehicle. In addition, preheating the line coolant prior to mixing the line coolant with reserve coolant having a greater temperature than the line coolant reduces the temperature differential between the line coolant and reserve coolant, thereby increasing the rate at which the engine and/or catalytic converter are heated and reducing the overall preheat time of the engine, improving fuel economy, and decreasing engine emissions.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of preheating a hybrid vehicle, the method comprising:
   storing reserve coolant in an insulated reservoir fluidly coupled to a coolant circuit of an engine of the hybrid vehicle, the reserve coolant having a temperature $T_R$;
   controlling, with an electronic control unit, a preheating system of the hybrid vehicle comprising the steps of:
   powering, with a power source external to the hybrid vehicle, a fluid pump fluidly coupled to the coolant circuit;
   pumping line coolant through the coolant circuit with the fluid pump, the line coolant having a temperature $T_L$ that is less than or equal to the temperature $T_R$ of the reserve coolant;
   powering, with the power source external to the hybrid vehicle, a heater thermally coupled to the coolant circuit;
   heating the line coolant with the heater as the line coolant is pumped through the coolant circuit to increase a temperature of the line coolant; and
   mixing the line coolant with the reserve coolant to accelerate preheating of at least the engine of the hybrid vehicle.

2. The method of claim 1, wherein the line coolant is mixed with the reserve coolant when a preheat temperature $T_P$ of the line coolant is greater than the temperature $T_L$ and less than or equal to the temperature $T_R$.

3. The method of claim 1, wherein the line coolant is mixed with the reserve coolant when the engine of the hybrid vehicle is started.

4. The method of claim 1, wherein storing the reserve coolant in the insulated reservoir further comprises siphoning line coolant that has been heated to a temperature greater than or equal to the temperature $T_R$ during operation of the engine of the hybrid vehicle from the coolant circuit and into the insulated reservoir.

5. The method of claim 1, further comprising the preliminary steps of:
   predicting, automatically with the electronic control unit, a start time of the hybrid vehicle; and
   determining a preheat start time based on at least the start time of the hybrid vehicle, wherein powering the fluid pump, pumping line coolant through the coolant circuit with the fluid pump, powering the heater, heating the line coolant, and mixing the line coolant with the reserve coolant are initiated at the preheat start time.

6. The method of claim 5, further comprising sensing an ambient temperature and determining the preheat start time based on the ambient temperature.

7. The method of claim 6, further comprising calculating a preheat duration based on the ambient temperature.

8. The method of claim 5, further comprising observing and logging, automatically with the electronic control unit, a driver behavior and determining, automatically with the electronic control unit, the preheat start time based on the driver behavior.

9. The method of claim 1, further comprising:
   opening a valve fluidly connected to a coolant circuit surrounding a cabin heater of the hybrid vehicle; and
   pumping line coolant through the coolant circuit surrounding the cabin heater of the hybrid vehicle to heat the cabin heater.

10. The method of claim 1, further comprising pumping line coolant through a heating jacket fluidly coupled to the coolant circuit and surrounding a catalytic converter of the hybrid vehicle.

11. A preheating system for a hybrid vehicle comprising:
    an insulated reservoir fluidly coupled to a coolant circuit of an engine of the hybrid vehicle, the insulated reservoir storing reserve coolant having a temperature $T_R$;
    a fluid pump fluidly coupled to the coolant circuit, wherein the fluid pump is powered by a power source external to the hybrid vehicle;
    a heater thermally coupled to the coolant circuit, wherein the heater is powered by the power source external to the hybrid vehicle; and an electronic control unit communicatively coupled to the fluid pump, the heater, and at least one valve of the insulated reservoir, the electronic control unit comprising a processor and a memory storing computer readable and executable instructions that, when executed by the processor cause the electronic control unit to:

pump line coolant through the coolant circuit with the fluid pump, the line coolant having a temperature $T_L$ that is less than or equal to the temperature $T_R$ of the reserve coolant;

heat the line coolant with the heater as the line coolant is pumped through the coolant circuit to increase the temperature $T_L$ of the line coolant; and open the at least one valve of the insulated reservoir to mix the reserve coolant with the line coolant and accelerate preheating of at least the engine of the hybrid vehicle.

12. The preheating system of claim 11, wherein the computer readable and executable instructions, when executed by the processor, cause the electronic control unit to release the reserve coolant to mix with the line coolant when the engine of the hybrid vehicle is started.

13. The preheating system of claim 11, further comprising:

at least one line coolant temperature sensor sensing the temperature $T_L$ of the line coolant, the at least one line coolant temperature sensor being communicatively coupled to the electronic control unit; and at least one reserve coolant temperature sensor sensing the temperature $T_R$ of the reserve coolant in the insulated reservoir, the at least one reserve coolant temperature sensor being communicatively coupled to the electronic control unit, wherein the computer readable and executable instructions, when executed by the processor, cause the electronic control unit to release the reserve coolant when a preheat temperature $T_P$ of the line coolant is greater than the temperature $T_L$ and less than or equal to the temperature $T_R$.

14. The preheating system of claim 11, wherein the computer readable and executable instructions, when executed by the processor, cause the electronic control unit to predict, automatically, a start time of the hybrid vehicle and determine a preheat start time based on at least the start time of the hybrid vehicle.

15. The preheating system of claim 14, further comprising an ambient temperature sensor sensing an ambient temperature $T_A$, the ambient temperature sensor being communicatively coupled to the electronic control unit, wherein the computer readable and executable instructions, when executed by the processor, cause the electronic control unit to sense the ambient temperature $T_A$ and predict the preheat start time further based on the ambient temperature $T_A$.

16. The preheating system of claim 11, further comprising a driver learning algorithm, wherein the computer readable and executable instructions, when executed by the processor, cause the electronic control unit to capture data corresponding to a behavior of a driver and predict a preheat start time further based on the behavior of the driver.

17. The preheating system of claim 11, further comprising a predetermined preheat start time stored in the memory, wherein the computer readable and executable instructions, when executed by the processor, cause the electronic control unit to initiate preheating at the predetermined preheat start time.

18. The preheating system of claim 11, further comprising a cabin heater system, wherein the cabin heater system comprises a coolant circuit and a valve fluidly coupled to the coolant circuit and communicatively coupled to the electronic control unit, wherein the computer readable and executable instructions, when executed by the processor, cause the electronic control unit to open the valve and allow line coolant to flow into the coolant circuit of the cabin heater system.

19. The preheating system of claim 11, further comprising a heating jacket fluidly coupled to the coolant circuit and surrounding a catalytic converter of the hybrid vehicle, wherein pumping line coolant through the heating jacket heats the catalytic converter.

20. The preheating system of claim 11, wherein the computer readable and executable instructions, when executed by the processor, cause the electronic control unit to siphon line coolant from the coolant circuit into the insulated reservoir during operation of the engine of the hybrid vehicle.

* * * * *